United States Patent [19]

French et al.

[11] 4,329,582

[45] May 11, 1982

[54] TANDEM MASS SPECTROMETER WITH SYNCHRONIZED RF FIELDS

[76] Inventors: J. Barry French, 4 Thornbank Rd., Thornhill, Ontario; Peter H. Dawson, 2008 Gatineau View Crescent, Ottawa, Ontario, both of Canada

[21] Appl. No.: 172,592

[22] Filed: Jul. 28, 1980

[51] Int. Cl.[3] .............................................. B01D 59/44

[52] U.S. Cl. ...................................... 250/292; 250/281

[58] Field of Search ............... 250/281, 284, 292, 296, 250/396 R

[56] References Cited

U.S. PATENT DOCUMENTS 3,147,445 9/1964 Wuerker et al. .................... 250/292

3,473,020 10/1969 Brubaker ............................ 250/293

4,234,791 11/1980 Enke et al. .......................... 250/296

*Primary Examiner*—Bruce C. Anderson

*Attorney, Agent, or Firm*—Rogers, Bereskin & Parr

[57] ABSTRACT

A tandem quadrupole mass spectrometer system having first, second and third quadrupole sections close coupled in series with one another. AC-only is applied to the center section and conventional AC and DC voltages are applied to the two end sections. The AC applied to all three sections is synchronized in frequency. The AC phase shift between each section is of magnitude between 0 and 0.1 cycles in absolute value, preferably between 0 and 0.03 cycles in absolute value, and in the preferred embodiment the AC phase shift between each section is essentially zero. The sections are spaced apart longitudinally by a very short distance not exceeding $r_o$, the radius of the inscribed circle within the quadrupole rods.

6 Claims, 31 Drawing Figures

TANDEM MASS SPECTROMETER WITH SYNCHRONIZED RF FIELDS

This invention relates to a tandem quadrupole mass spectrometer system.

In a paper published at page 2274 of the 1978 issue of Journal of the American Chemical Society, R. A. Yost and C. G. Enke have published a letter disclosing that a tandem mass spectrometer system may be used to create ion species from a sample, select one individual ion species, fragment that species, and obtain the mass spectrum of the fragments. The letter discloses that a quadrupole mass filter, an AC-only quadrupole section, and a second quadrupole mass filter are arranged in series. Gas is introduced into the center quadrupole section to produce collision induced dissociation. Each quadrupole is arranged in its own cylindrical container with end apertures and operates separately. With a system such as this, it is found that ion signal losses are very large as the ions travel from one quadrupole to the next, and therefore the sensitivity of the apparatus is greatly reduced.

According to the present invention it is found that greatly increased ion transmission can be achieved in most instances by close coupling the quadrupole sections together and by providing a specific relationship for the AC fields in the tandem sections. In its broadest aspect the invention provides a quadrupole mass spectrometer system having a vacuum chamber, first and second sets of elongated rods in said chamber, the rods of each set being spaced laterally apart a short distance from each other to define a longitudinally elongated space between the rods of each set for ions to travel through said space, said first set of rods being located end to end with said second set of rods so that said spaces are linearly aligned so that an ion may travel through both said spaces, the ends of the rods of said first set being located closely longitudinally adjacent the ends of the rods of said second set, the rods of said first set being DC electrically insulated from the rods of said second set, means for applying an AC-only voltage to said rods of said second set, means for applying both AC and DC voltages to the rods of said first set, the AC voltage applied to each of said sets of rods being synchronized in frequency, the AC voltage applied to one of said sets of rods being shifted in phase with respect to the AC voltage applied to the other set of rods by an amount the absolute value of which is between zero and 0.1 cycles.

Further objects and advantages of the invention will appear from the following description, taken together with the accompanying drawings in which.

Figure 1:
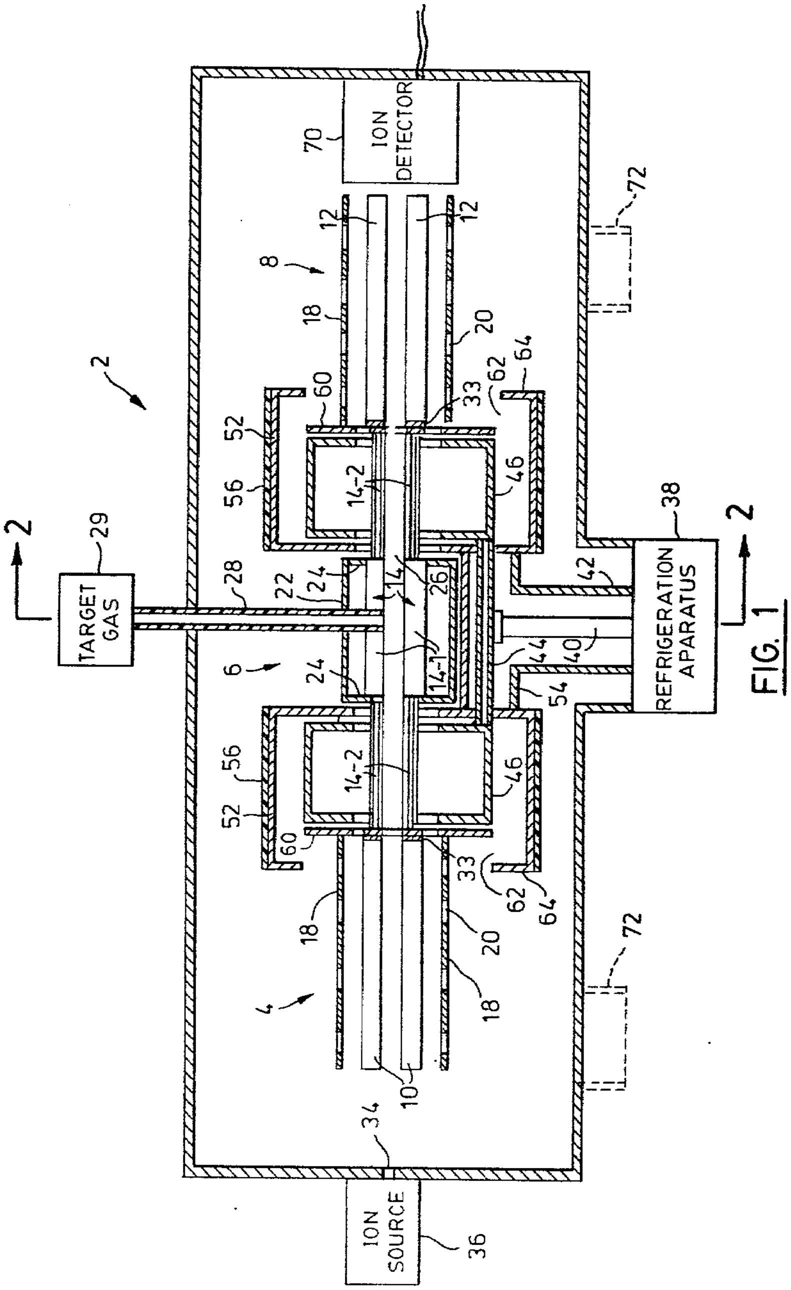
FIG. 1 is a partly diagrammatic cross sectional view of a mass spectrometer system which may be used with the present invention.
Figure 8:
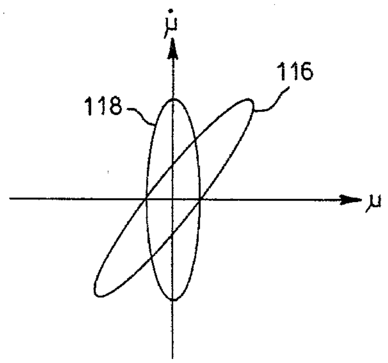
FIG. 8 is a plot showing typical emittance or acceptance elipses for a mass spectrometer.
Figure 8A:
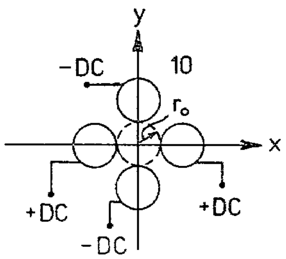
Figure 9:
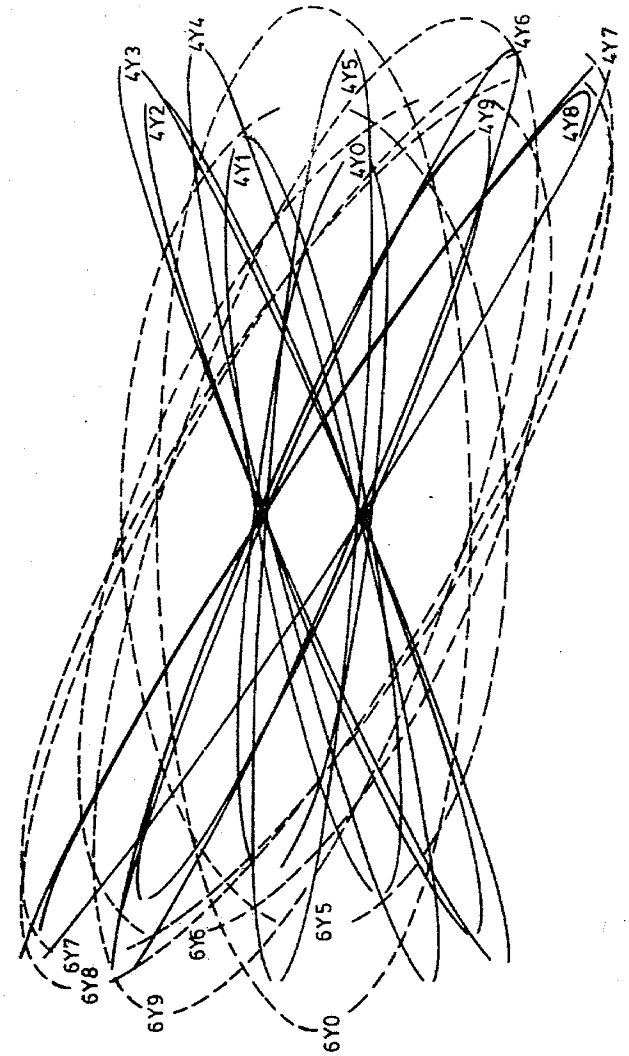
Figure 10:
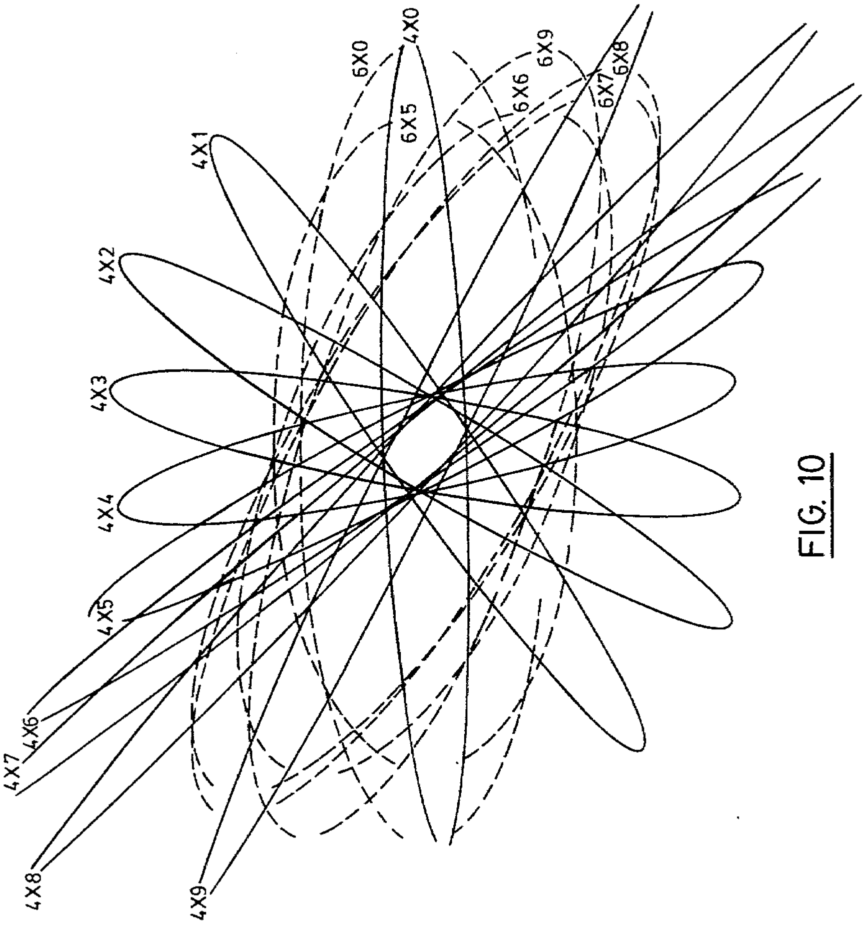
Figure 11:
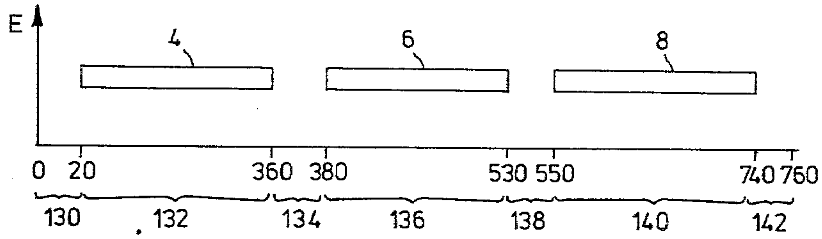
Figure 12:
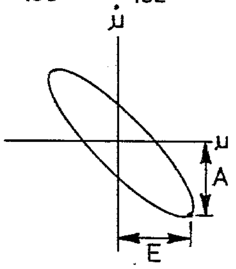
Figure 30:
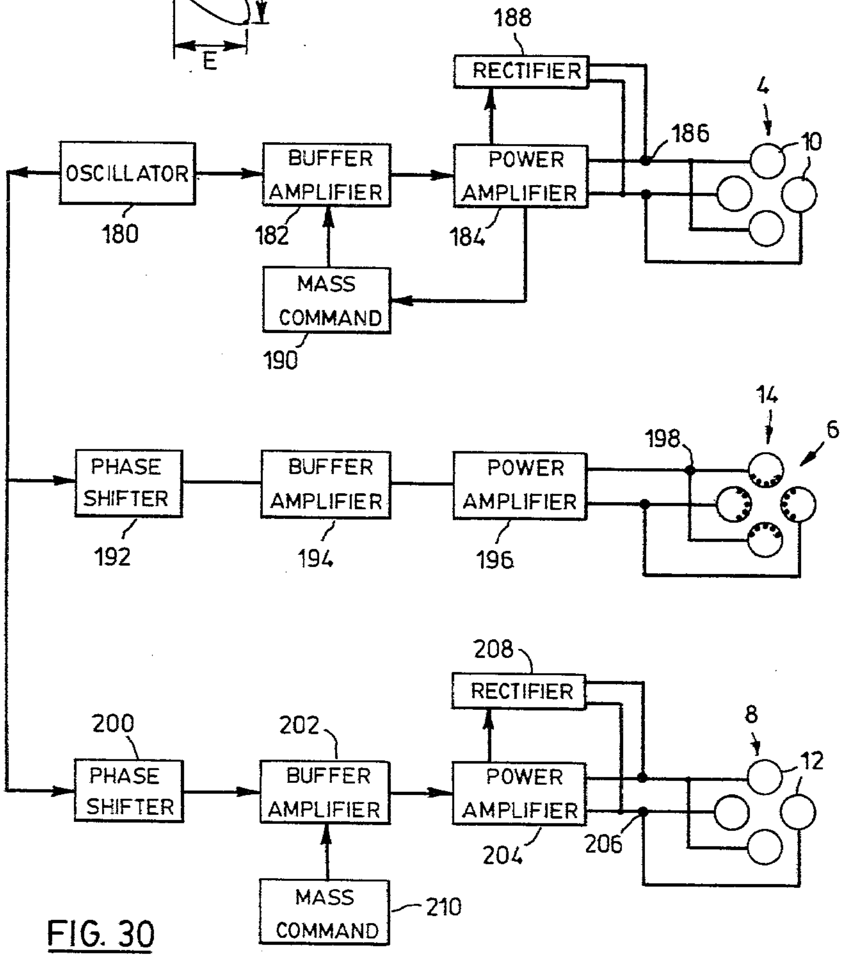

FIG. 8*a* is an end view of the rods of a mass spectrometer showing the x and y directions;

FIG. 9 is a plot showing typical emittance and acceptance elipses for the system of FIG. 1 in the y direction;

FIG. 10 is a plot showing typical emittance and acceptance elipses for the system of FIG. 1 in the x direction;

FIG. 11 is a plot showing the travel time of an ion through the system of FIG. 1 expressed in terms of cycles of the applied AC field;

FIG. 12 is a plot showing the characteristics of a typical ion source;

FIGS. 13 to 29 are plots showing envelope functions for various mass spectrometer systems of the kind shown in FIG. 1; and FIG. 30 is a block diagram of an electrical control system for use with the mass spectrometer system of FIG. 1.

Reference is first made to FIG. 1, which shows a specific mechanical arrangement which may be used to implement the invention. The mechanical arrangement shown, with open structure AC-only rods, is as described in the co-pending application of J. B. French filed concurrently herewith.

Figure 3:
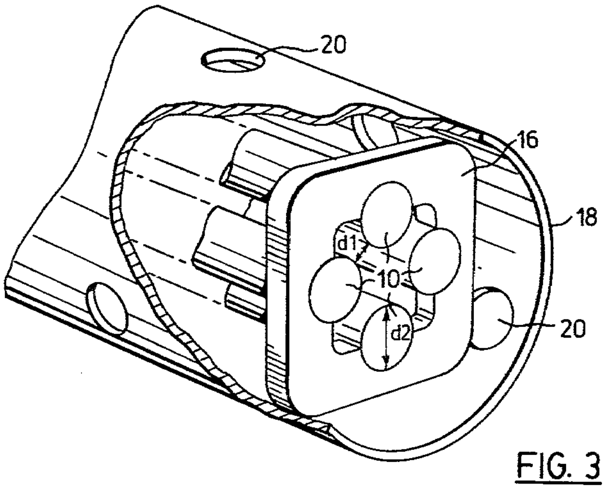
FIG. 3 is a perspective view, partly in section, showing the rods of one of the mass spectrometers of FIG. 1 mounted in a holder.

FIG. 1 shows a vacuum chamber generally indicated at 2 and which contains three mass spectrometer sections generally indicated at 4, 6, and 8 respectively. Spectrometer section 4 is of conventional quadrupole square pattern. Spectrometer section 8 is also a conventional quadrupole mass spectrometer and similarly contains four rods 12 arranged in a normal square pattern. Spectrometer section 6 also contains four rods 14, arranged as shown in FIG. 3 in normal quadrupole fashion. However the rods 14 have solid center portions, indicated at 14-1, and open structure end extensions, indicated at 14-2.

The center portions 14-1 of rods 14, and also the rods 10, 12 of quadrupole sections 4, 8 are held in conventional holder plates 16 (FIG. 3). The plates 16 of quadrupole sections 4, 8 are located in conventional cylindrical cans or housings 18 (FIGS. 1, 3) which are normally used for mass spectrometers. The cans or housings 18 have apertures 20 therein to allow gas within the mass spectrometer sections 4, 8 to be pumped away. The center portions 14-1 of rods 14 are however housed in a cylindrical can 22 which is closed except at its ends, which are defined by end discs 24 having apertures 26 therein. In addition a duct 28 carries a target gas from a source 29 into the can 22 and into the space between the centre portions 14-1 of rods 14.

Figure 4:
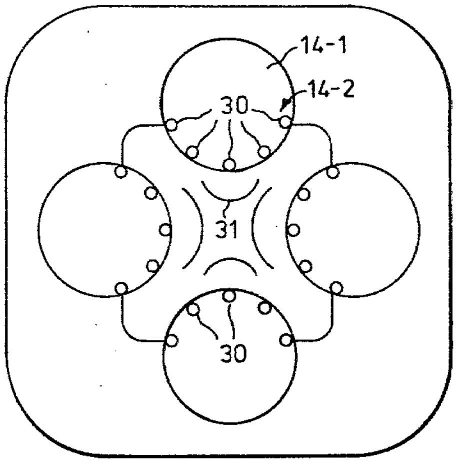
FIG. 4 is an end view showing open structure rods of the mass spectrometer system of FIG. 1.
Figure 5:
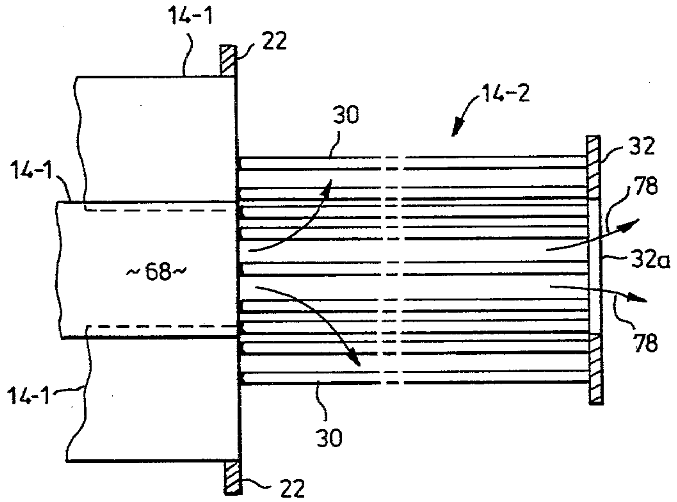
FIG. 5 is a side view showing the rods of FIG. 4.

The open structure rod extensions 14-2 of the rods 14 are formed, as shown in FIGS. 4, 5 of thin stiff rods or wires 30. Each set of wires 30 is arranged in a curved configuration to simulate the shape of the outer portion of a normal quadrupole rod, so that the field produced by the four sets of wires 30 will correspond as closely as possible to the normal hyperbolic field 31 (FIG. 4) produced by the solid rods of a conventional quadrupole. The wires 30 are supported at their inner ends by welds or solder connections to the solid rod portions 14-1. At their outer ends the wires 30 are supported by a holder 32 (see especially FIG. 5) which also acts as a barrier to help limit the amount of gas from the centre quadrupole section 6 entering the end quadrupole sections 4, 8, but which has a central aperture 32 to permit ions to pass therethrough. Typically five thin wires may be used, spaced around somewhat less than half the inner circumference of the equivalent solid rod.

The three quadrupole sections 4, 6, 8 are mounted in axial alignment, end to end along the axis of the cylindrical vacuum chamber 2, being held in position by support members not shown. Each rod of each of the three sets is aligned axially with each corresponding rod of each other set, so that the spaces between the rods of each set are linearly aligned, for ions to pass therethrough. The ends of the rods 10, 12 and 14 are DC insulated from each other by a small air gap or thin layer of insulating material, indicated at 33.

The end wall of the vacuum chamber 2 contains an aperture 34 through which ions to be examined are supplied from an ion source 36. Ion source 36 may typically be the source shown in U.S. Pat. No. 4,148,196, in which a trace gas is admitted to an ionization chamber, ionized, and the resultant ions are drawn by appropriate electric potentials through a curtain gas chamber into the vacuum chamber 2. Curtain gas in the curtain gas chamber serves to block entry of unwanted materials into the vacuum chamber 2, and the curtain gas, which may typically be pure nitrogen, also enters the vacuum chamber where it is cryopumped thus permitting maintenance of a high vacuum in the vacuum chamber 2.

Figure 2:
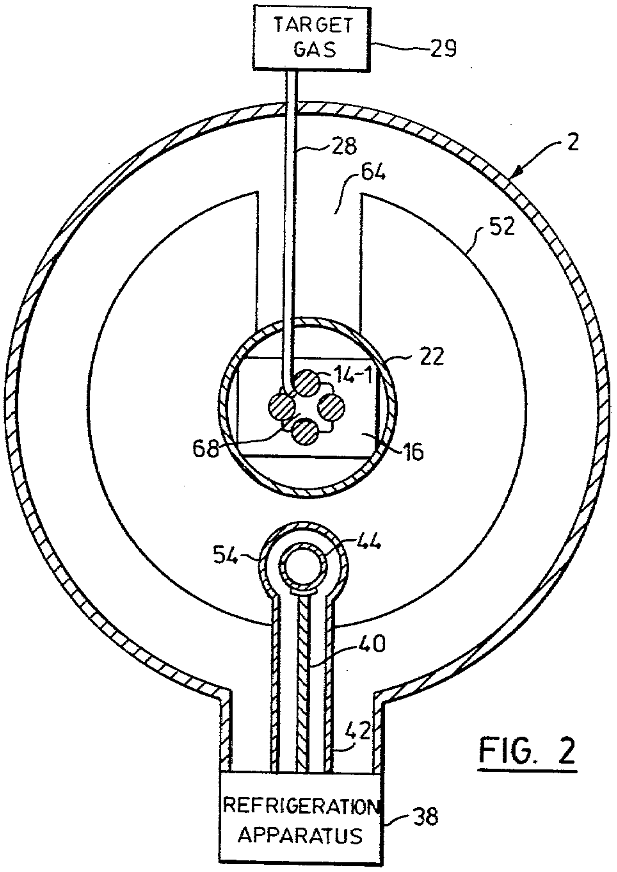
FIG. 2 is a cross sectional view of the apparatus of FIG. 1 taken along lines 2—2 of FIG. 1.

As shown in FIGS. 1 and 2, appropriate cooling means are provided to cryopump the curtain gas entering the vacuum chamber 2. Specifically, a refrigerating mechanism 38 is provided having an inner tubular finger or cold station 40 and an outer finger or second cold station 42. The mechanism 38 is typically able to extract 2–4 watts of thermal energy from the inner finger 40 at 20° K., and is also typically able to extract 5–10 watts of thermal energy from the outer finger 42, at 70° to 90° K.

A copper support tube 44 is mounted on the top of the inner finger 40, in good thermal contact therewith, and supports at each end a cylindrical shell 46, also made of a good thermal conducting material such as copper. The shells 46 have end walls 48 and contain slots (not shown) in their upper surfaces so that the center quadrupole section 6 may be fitted downwardly into the shells 46.

A pair of intermediate shells 52 are connected to the outer finger 42 and serve to reduce the heat load on the inner shells 46. The intermediate shells 52 are mounted on an outer copper support tube 54 concentric with the inner support tube 44, the outer tube 54 being mounted on the second finger 42. The exterior surfaces of the intermediate shells 52 are insulated with aluminized plastic film, as indicated at 56, to reduce heat radiation to the intermediate shells 52. The outer end walls of the intermediate shells 52 contain inset centre sections 50 spaced by annular gaps 62 from the outer end wall sections 54 and supported thereon by support struts, not shown. The gaps 62 assist in cryopumping gas from the end quadrupole sections 4, 8, as will be explained. The intermediate shells 52 also contain slots, shown at 64, FIG. 2, in thin upper surfaces to facilitate assembly of the operations.

In operation, ion species from a sample to be considered are supplied from ion source 36 and are focused (by conventional means not shown) to enter the first quadrupole section 4. In the first quadrupole section ions of the desired mass are selected and enter the central quadrupole section 6. In the central quadrupole section 6, the ions encounter a target gas supplied via duct 28 into the space 68 between the rods 14 of the center quadrupole section. The resultant collisions induce dissociation of the ions into fragments or daughter ions, which are then transmitted into the third quadrupole section 8. The third quadrupole section 8 acts as a mass filter, selecting the desired fragments or daughter ions for detection by an ion detector 70. In order to act as mass filters, the end quadrupole sections 4, 8 are supplied with conventional AC and DC voltages, but the center quadrupole section 6, which must pass a wide range of masses, has only an AC voltage applied to its rods 14. The gas pressure in the first and third quadrupole sections 4, 8 must be low, typically $10^{-5}$ torr or less for proper quadrupole operation. For this purpose the vacuum chamber 2 is pumped either by being fitted with appropriate cryocooling surfaces, as explained in U.S. Pat. No. 4,148,196, or by vacuum pumps connected to ports 72 in the chamber 2. Target gas in the center quadrupole section 6, which tends to enter the space between the rods of the end quadrupole sections 4, 8, is largely pumped away by flowing through the open spaces between the wires 30 and condensing on the cooled surfaces of inner shells 46.

The advantages of the open structure of the rod extensions 14-2, formed by wires 30, are as follows. Normally in a quadrupole section the gap d1 (FIG. 3) between the rods is relatively small compared with the diameter d2 of the rods (typically d1 may be about one third of d2). Thus if the rods are solid, relatively little gas can escape between them, and therefore a substantial gap must be left between the ends of adjacent quadrupole sections, so that the gas can exit through this gap and so it will not unduly pressurize the cans of the end quadrupole sections 4, 8. For reasons to be explained, large gaps between the quadrupole sections result in substantial ion signal losses.

With the open structure rod extensions 14-2 shown, the quadrupole sections 4, 6, 8 can be placed very closely adjacent each other, the ends of the rods of each section being separated only by the small gap 33 as discussed. Since a quadrupole section having an AC-only field applied thereto requires less accuracy of manufacture than a quadrupole section having both AC and DC applied to its rods, the open structure described may be used with little or no degradation in performance. Provided that the open sections 14-2 are of reasonably substantial length, only a small proportion of the target gas entering the centre quadrupole section 6 will travel into the end sections 4, 8.

In a typical system of the kind described, the parameters of the system may be adjusted so that the gas density in the target region, i.e. in the space between rods 14-1, is in the range between $10^{-2}$ torr and $10^{-4}$ torr, and the lengths of rod extensions 14-2 are each equal to the lengths of rods 14-1 (e.g. 4 inches). Then most of the gas in the target region 68 travels outwardly through the gaps between the wires 30, as indicated by arrows 76, FIG. 5. Only a small proportion of the gas, indicated by arrows 78, is beamed directly into the space between the rods of the end quadrupole sections 4, 8. Typically the gas flow entering the spaces between the rods of the end quadrupole sections 4, 8 may be only about 1/200 of the flow through duct 28.

Although the rods of the centre quadrupole section 6 are shown as having solid centre sections, they can be entirely of open construction, formed by thin wires stretched in tension between end discs spaced apart by support bars, as shown and described in the said co-pending application of J. B. French. Alternatively, the rods of the centre section can be constituted by groups of longitudinally extending wires, using the principles given in a paper published by H. Matsuda and T. Matsuo entitled "A New Method of Producing an Electric Quadrupole Field", published in the International Journal of Mass Spectrometry and In Physics, No. 24, 1977 at page 107. By using such principles a quadrupole field can be produced using a number of wires suitably located, and not necessarily in the same locations as the usual solid rods themselves would assume. Such structure can be used and a gas target region created within it, provided that there is minimal interference with gas escaping from the structure. The groups of wires which produce a quadrupole field in effect act as rods and the term "rods" in the appended claims refers to any groups of wires or other structure which produces a quadrupole type field.

Where it is desired to study for example the metastable decomposition of ions, then there is no need to introduce gas into the centre quadrupole section 6 and the rods then need not be of open structure.

Figure 6:
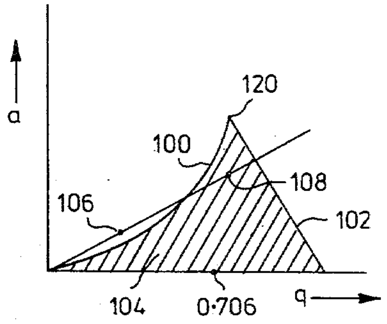
FIG. 6 is a standard stability diagram for a mass spectrometer.

It is found that close coupling the mass spectrometer sections, permitted for example by the structure shown in FIGS. 1 to 5, has substantial advantages relating to the transmission of ions through the tandem sections. Reference is made to FIG. 6, which is a standard stability diagram for a quadrupole mass spectrometer. FIG. 6 plots "a" against "q", where $$a = \frac{4e \cdot \text{DC voltage applied to rods}}{w^2 r_o^2 m}$$

$$q = \frac{2e \cdot \text{AC voltage applied to rods}}{w^2 r_o^2 m}$$

and where

- m is the mass of the ion passing through the spectrometer,
- $r_o$ is the radius of the inscribed circle between rods,
- w is the angular frequency of the applied AC,
- e is the electronic charge.

As shown, a quadrupole mass spectrometer has a high mass cutoff, indicated by line 100, and a low mass cutoff, indicated by line 102. The shaded area 104 between the high mass and low mass cutoff lines 100, 102 is a stable region in which an ion trajectory will not touch the rods, i.e. the trajectory is limited in amplitude, i.e. it is non-divergent. As is standard for all quadrupole mass spectrometers, the high mass and low mass cutoff lines 100, 102 intersect at a value of q=0.706.

The equations given are for infinitely long rods, and where the rods end, the fields fall off. Although the equations do not apply exactly beyond the ends of the rods, it is found that effectively the AC and DC voltages fall off together outside the rods so that an ion approaching the rods may for example find itself at point 106 as it approaches the rods and then at point 108 as it travels within the rods. Point 106 is outside the stable region and hence many ions are usually lost where an ion stream enters or leaves a quadrupole field.

Figure 7:
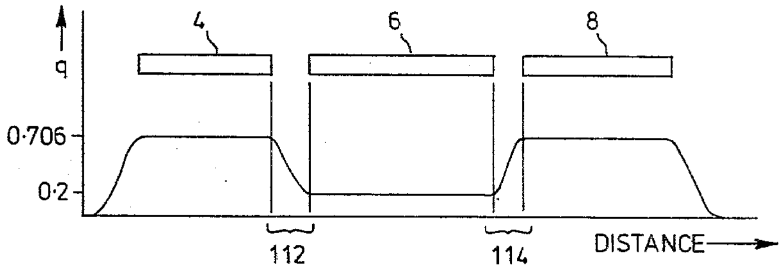
FIG. 7 is a plot showing diagrammatically the rise and fall of the AC field along the length of the tandem mass spectrometer system of FIG. 1.

Reference is next made to FIG. 7, which shows diagrammatically the three quadrupole sections 4, 6, 8 with the amplitude q of the AC field plotted at 110 beneath them. It will be seen that since the quadrupole sections are close coupled, the field amplitude 110 does not fall to zero and then rise up again between sections; instead the field amplitude in the transition regions 112, 114 between quadrupole sections falls directly from the higher values existing for the sections 4 and 8 to the lower value associated with section 6. Typically the value of q in the sections 4 and 8 will be at or near 0.706, so that the sections 4, 8 operate near the top of the stability diagram, for high selectivity and resolution. Preferably the value of q in the centre section 6 will be about 0.2, so that when ions are fragmented thereby producing daughter ions of smaller mass, q for the daughter ions will not increase to such a high value as to be outside low mass cutoff line 102 (which would cause the daughter ions not to be transmitted). Since in the transition regions the field does not fall to zero, but instead the operating conditions remain within the stability region, less ion signal is lost.

It is also found that the transmission of ions from one quadrupole to another is different for each phase of the applied AC field. Reference is made to FIG. 8, where the value "u" is plotted against "u", where u is the displacement of an ion in either the x or y direction between the rods, divided by $r_o$, and u is the velocity in the u direction. FIG. 8 should be considered together with FIG. 8*a*, which shows the x and y directions and $r_o$ for a set of rods 10. The x direction is the direction between the positively changed rods 10, assuming that positively charged ions are being analyzed, while the y direction is then the direction between the negatively charged rods 10. (For the centre section 6, where there is no DC, the x and y directions are the same.) It will be appreciated that if u exceeds 1, then either x or y (depending on which u represents) exceeds $r_o$, meaning that ions of interest are contacting a rod and are being lost.

As illustrated in FIG. 8, it is known that all ions within the stable region 104 of the stability diagram of FIG. 6 and which enter between the rods 10 at a given initial phase of the AC field, and have values of u and u within an elipse such as that indicated at 116, will travel through rods 10; all other ions will be lost by contact with the rods. As the initial phase changes, the ellipse 116 rotates and changes its shape, and a typical ellipse for ions entering at a different phase of the AC field is indicated at 118 in FIG. 8. Ellipses 116, 118 may be either acceptance ellipses, meaning that any ions entering the rod set at a given phase of the AC field with the values of u and u contained within the ellipse will pass through the rod set, or they may be termed emittance ellipses, meaning that any ions having the values of u and u shown in the ellipse at the exit of the rod set, for a given AC phase at the exit of the rod set, have passed through the rod set.

When a quadrupole is operating near the tip of its stability diagram, i.e. near point 120 (FIG. 6), the resolution of the quadrupole is higher since the region in which ions are stable is smaller, and therefore the acceptance or emittance ellipses of a quadrupole operating near the point 120 become smaller in area. However when a quadrupole is operated with AC only on its rods, it operates on the q axis and the region of stable operation is much larger, so it is a much less selective mass filter. Therefore the acceptance and emittance ellipses of the end quadrupole sections 4, 8, where both AC and DC potentials are applied, are much smaller in area than those of the centre quadrupole section 6, where AC only is applied.

It may be noted that the emittance and acceptance ellipses are calculated by following the movement of a typical ion, using the fundamental equations of motion for the ion, and integrating them numerically to determine the path of the ion. A program for calculating the ellipses is contained in a publication entitled "Quadrupole Mass Spectrometry", edited and partly authored by Peter Dawson, and published in 1976 by Elsevier.

Reference is next made to FIG. 9, which shows emittance ellipses for end quadrupole section 4 and acceptance ellipses for the center quadrupole section 6. The ellipses drawn are for the y direction, i.e. in the plane extending between the negatively biased rods assuming that the ions under analysis are positively biased. The emittance ellipses for the quadrupole section 4 are shown in solid lines at 4y0 to 4y9 for 10 different initial phases of the AC field. The ten phases are 0.1 cycles, i.e. 36°, apart. It will be seen that the axis of the initial ellipse 4y0 is rotated slightly clockwise from the horizontal and that the subsequent ellipses rotate and change in shape as they are rotated. The direction of rotation is not uniform and although ellipse 4y2 is rotated counterclockwise from ellipse 4y1, ellipse 4y4 is rotated clockwise from ellipse 4y3. Six of the acceptance ellipses for the centre quadrupole section 6, for the y direction, are shown in dotted lines in FIG. 9 at 6y0 and 6y5 to 6y9. The remaining four phases are symmetrical with phases 6y8 to 6y9 and are therefore not plotted. It is found that the best overall matching of the emittance and acceptance ellipses, for maximum transmission of ions in the y direction, occurs when the frequencies and phases of the AC fields applied to all of the rod sections 4, 6, 8 are synchronized, with little or no phase shift between adjacent rod sections. The emittance ellipses are then best contained within the acceptance ellipses.

Although ellipses 4y0 to 4y9 have been described as emittance ellipses for quadrupole section 4, they can, since the system is symmetrical, also be regarded as acceptance ellipses for the quadrupole section 8, and ellipses 6y0 to 6y9 can be regarded as emittance ellipses for centre quadrupole section 6. Again best matching in the y direction occurs when there is little or no phase shift between the AC voltages applied to the three rod sections, although there will be more losses in ions traveling from section 6 to section 8 since emittance ellipses 6y0 to 6y9 are larger than acceptance ellipses 8y0 to 8y9.

Matching is generally more difficult in the x direction than in the y direction. Reference is next made to FIG. 10, which shows in solid lines emittance ellipses 4x0 to 4x9 for the end rod section 4 and shows in dotted lines acceptance ellipses 6x0 and 6x5 to 6x9 for the center rod section 6. (The remaining acceptance ellipses for the centre rod section 6 are symmetrical with ellipses 6x6 to 6x9.) Although it is not immediately apparent from FIG. 10, it is again found, by an analysis to be discussed, that best overall ion transmission occurs when there is little or no phase shift between the AC voltages applied to all three rod sections.

To solve the problem of determining the phase relations which will provide the best transmission of ions through the three tandem rod sets, a number of envelope function diagrams have been prepared. Reference is next made to FIG. 11, which explains the interpretation of the envelope function diagrams. In FIG. 11, the envelope E is plotted on the vertical axis and the location of ions as they travel through the three tandem quadrupole spectrometers is plotted on the horizontal axis. The horizontal axis is divided into tenths of AC cycles, marked from 0 to 760 (76 cycles). As the ions from the ion source 36 approach the first rod set 4, assuming a uniform speed for the ions, they pass through an entrance fringing field indicating at 130 and which typically is two cycles in length. The ions then travel through the first rod section 4, this process for example occupying 34 cycles, which are indicated at 132. The ions then pass through a 2 cycle fringing field 134 to the second rod section 6, where they spend (for example) 15 cycles in the second rod section 6. This period is indicated at 136. The ions then pass through another 2 cycle transition region or fringing field 138 to the third rod section 8 where they spend (for example) 19 cycles as indicated at 140. The ions then leave the third rod section 8, passing through another two cycle fringing field 142, and travel to the ion detector 70.

The envelope value E which is plotted along the vertical axis represents the largest displacement of any ion at any time at the location in question, divided by $r_o$. The envelope functions are calculated for the x and y directions by determining the trajectories of representative ions according to the techniques used in linear accelerator design, as explained in a book entitled "High Energy Beam Optics" by Claus G. Steffen, a Wiley & Sons publication, with reference particularly to chapter 4 section 5. The envelope functions to be discussed assume (except where indicated) the use of a source characterized as shown in FIG. 12 by an envelope $E=0.2$ (which indicates how far transversely the source emits ions), a maximum angular deviation A of $-0.028$ and an area of $0.0025\pi$. These are typical normal values for an ion source.

Figure 13:
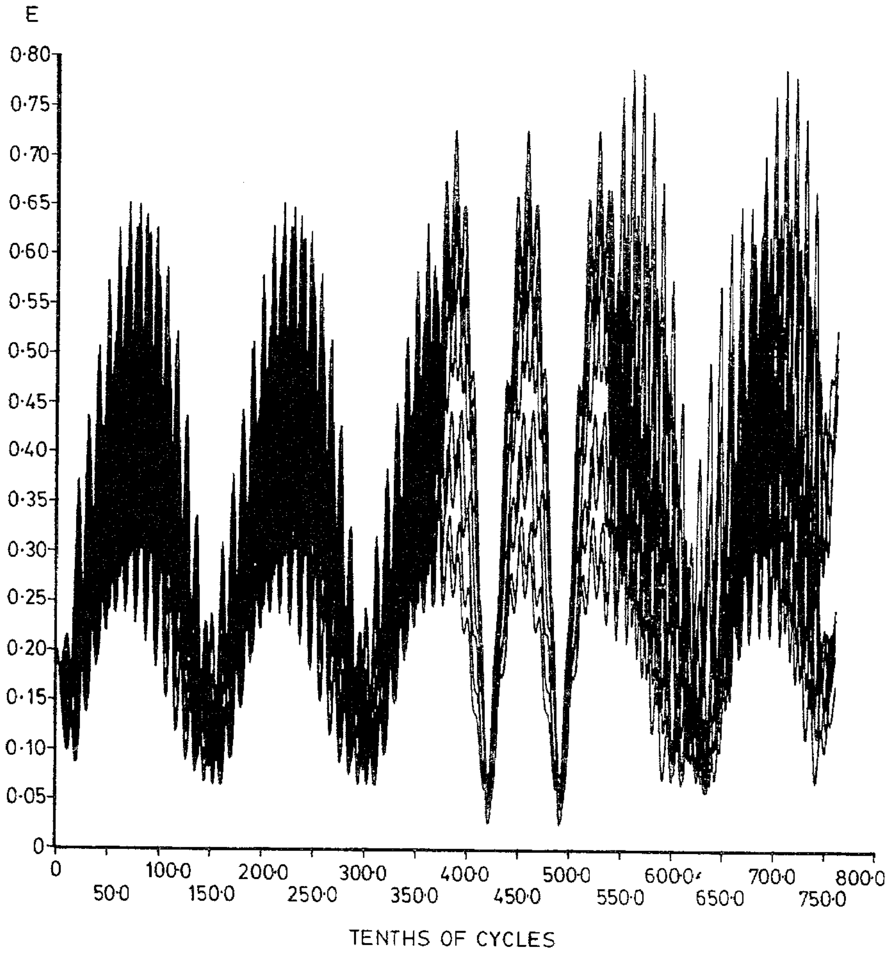

The envelope functions E shown in FIG. 13 and following are each for ten different initial phases of the AC field, i.e. each envelope function is actually ten different curves superimposed on each other. If the value of E exceeds 1, this indicates that some ions are being lost by contact with the rods. Of course even when E exceeds 1, ions entering at some initial phases will be transmitted although ions entering at other initial phases will be lost.

FIG. 13 Y envelope function

FIG. 13 illustrates the preferred case where there is zero phase shift between sections 4, 6 and 8. Here it is seen that the maximum value of E in the Y direction does not exceed 1 and there are theoretically no losses of selected ions in the y direction during transmission through the three quadrupole sections.

Figure 14:
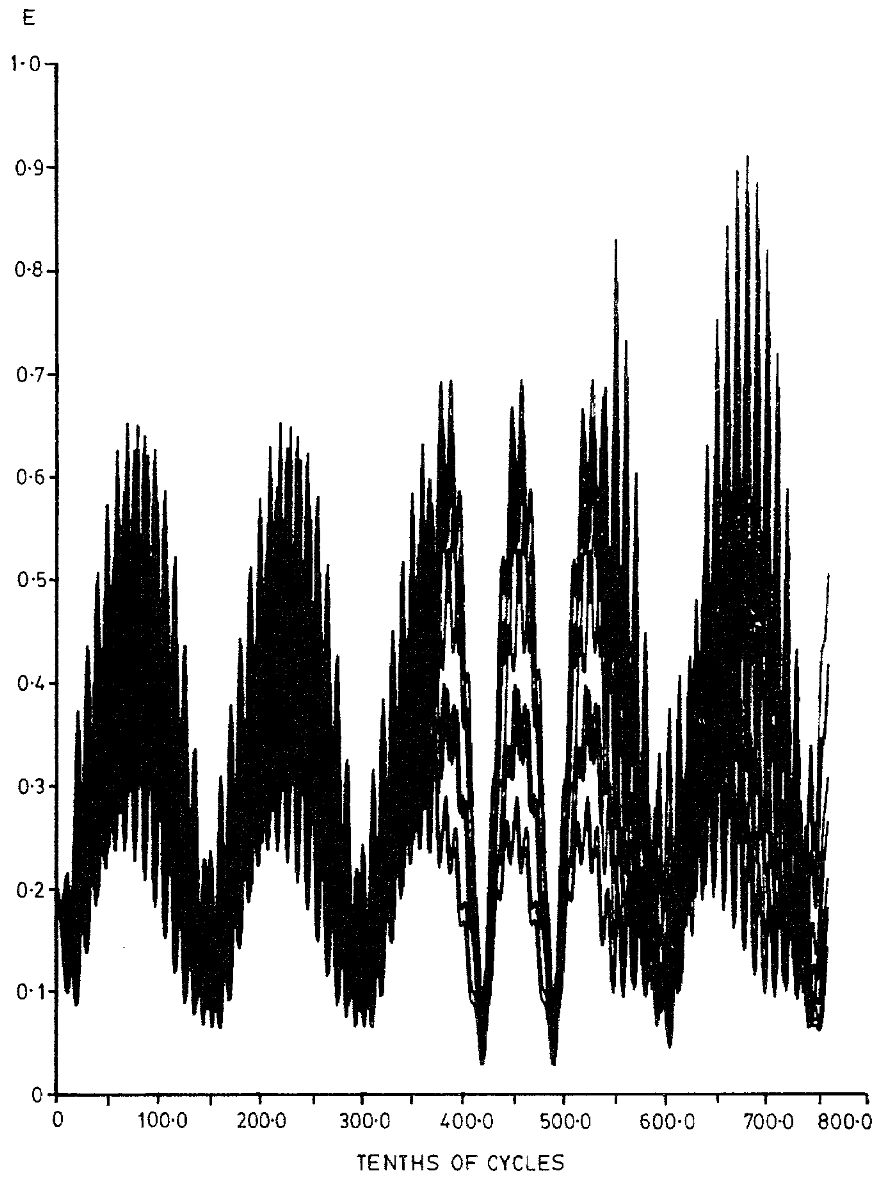

FIG. 14 Y envelope function

FIG. 14 illustrates the Y envelope function where there is a phase shift of +0.1 cycle (36 degrees) between section 4 and section 6, but no phase shift between sections 6 and 8. Here again, E remains less than 1 throughout the system and there are theoretically no losses in the Y direction.

Figure 15:
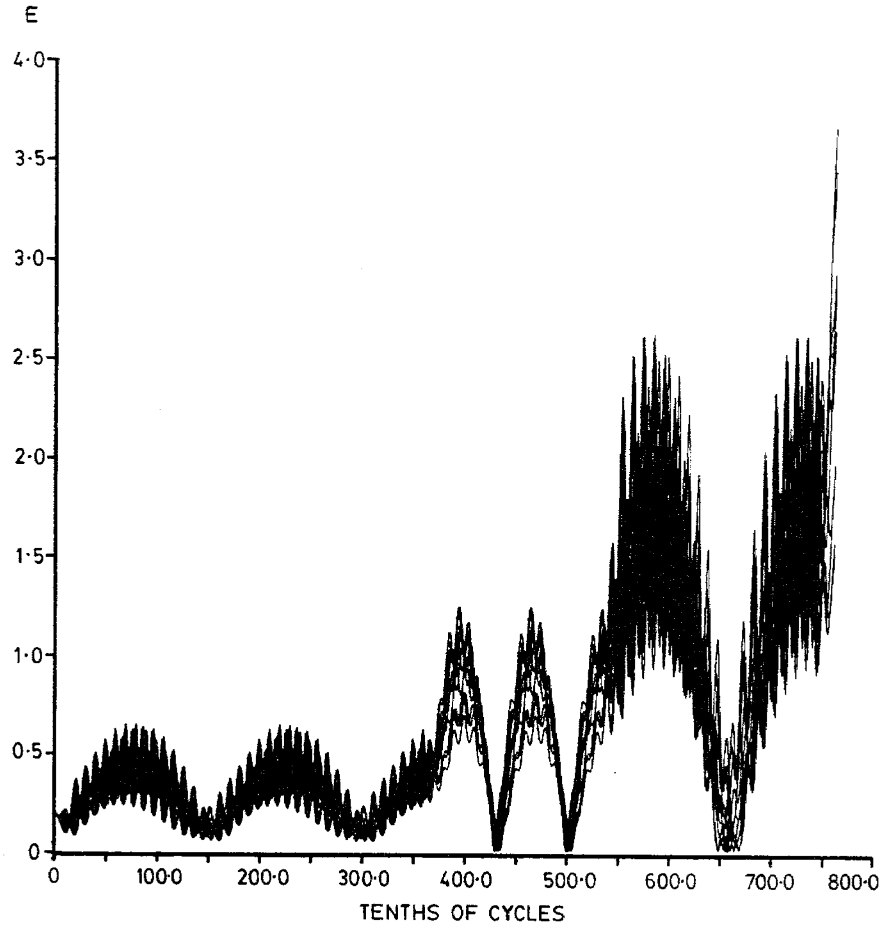

FIG. 15 Y envelope function

FIG. 15 illustrates the Y envelope function where there is a phase shift of −0.2 cycles (72 degrees) between sections 4 and 6, but no phase shift between sections 6 and 8. It will be seen that E slightly exceeds 1 in the centre section 6 and considerably exceeds 1 in the third section 8 even though there is no phase shift between sections 6 and 8. It will be seen that the phase shift between sections 4 and 6 strongly affects transmission between sections 6 and 8 in the y direction.

Figure 16:
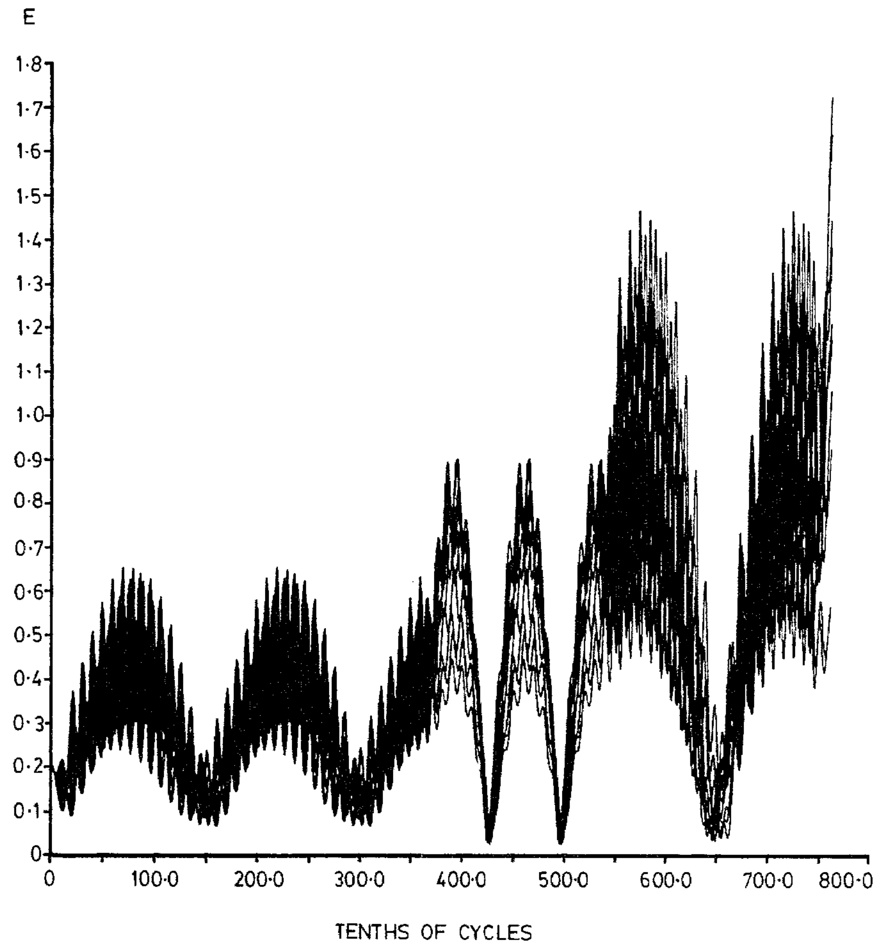

FIG. 16 Y envelope function

FIG. 16 illustrates the Y envelope function where there is a phase shift of −0.1 cycles (36 degrees) between sections 4 and 6 (i.e. a smaller shift than FIG. 15), and again no shift between sections 6 and 8. Here E is less than 1 in the first and second sections 4, 6 but exceeds 1 in the third section 8, indicating some losses, although not unduly large losses.

Figure 17:
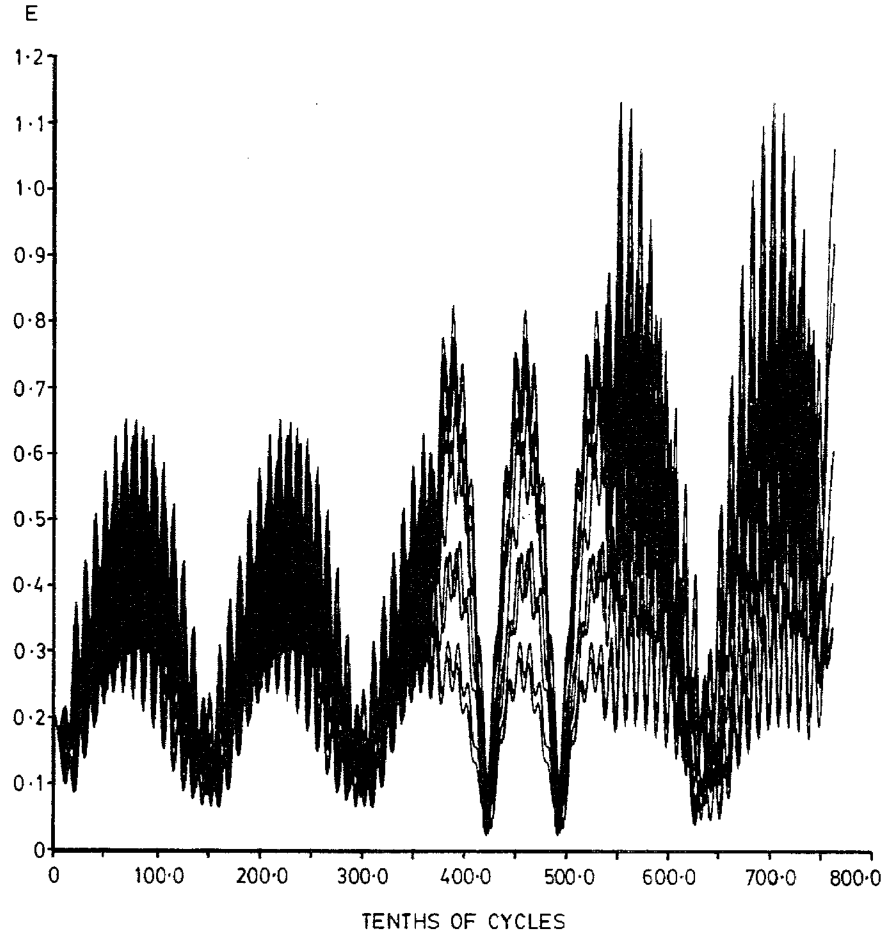

FIG. 17 Y envelope function

FIG. 17 illustrates the Y envelope function where there is a phase shift of +0.2 cycles (72 degrees) between sections 4 and 6 and no shift between sections 6 and 8. Again E is less than 1 in sections 4 and 6 but slightly exceeds 1 in section 8, indicating slight losses in the Y direction.

Figure 18:
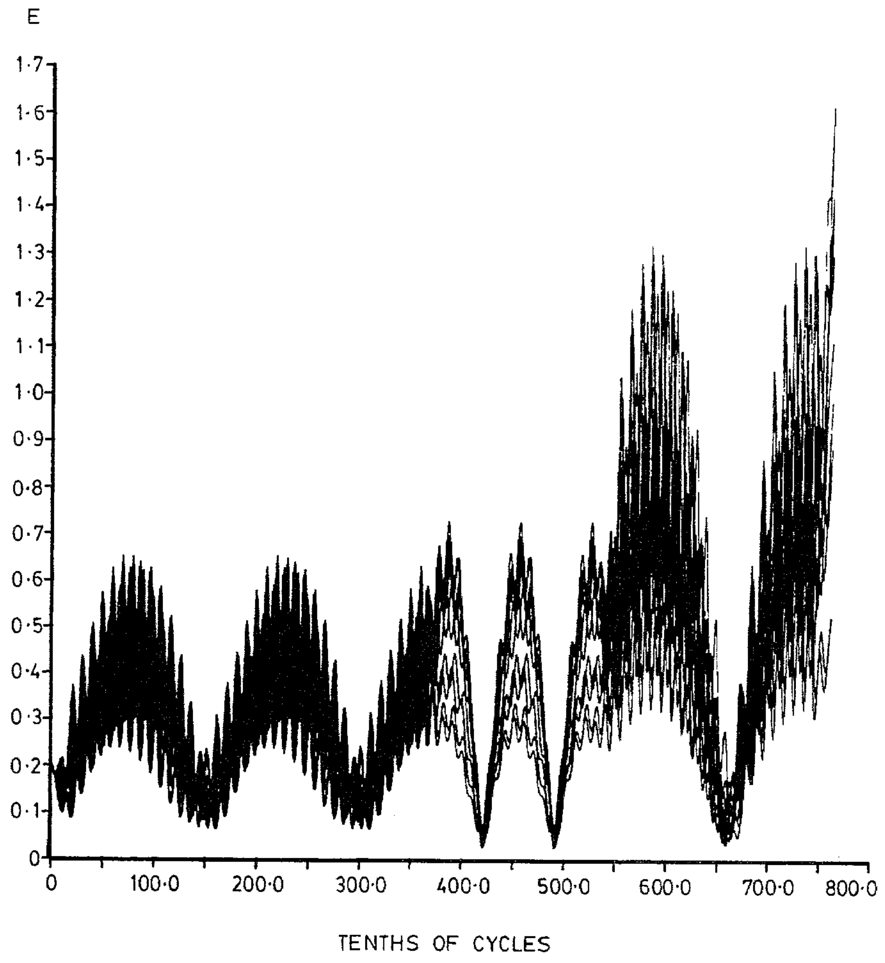

FIG. 18 Y envelope function

FIG. 18 illustrates the Y envelope function where there is no phase shift between stages 4 and 6 and a −0.1 cycle (−36 degrees) phase shift between stages 6 and 8. Here E is less than 1 until the third stage 8 is reached, where it then exceeds 1, indicating some ion losses.

Figure 19:
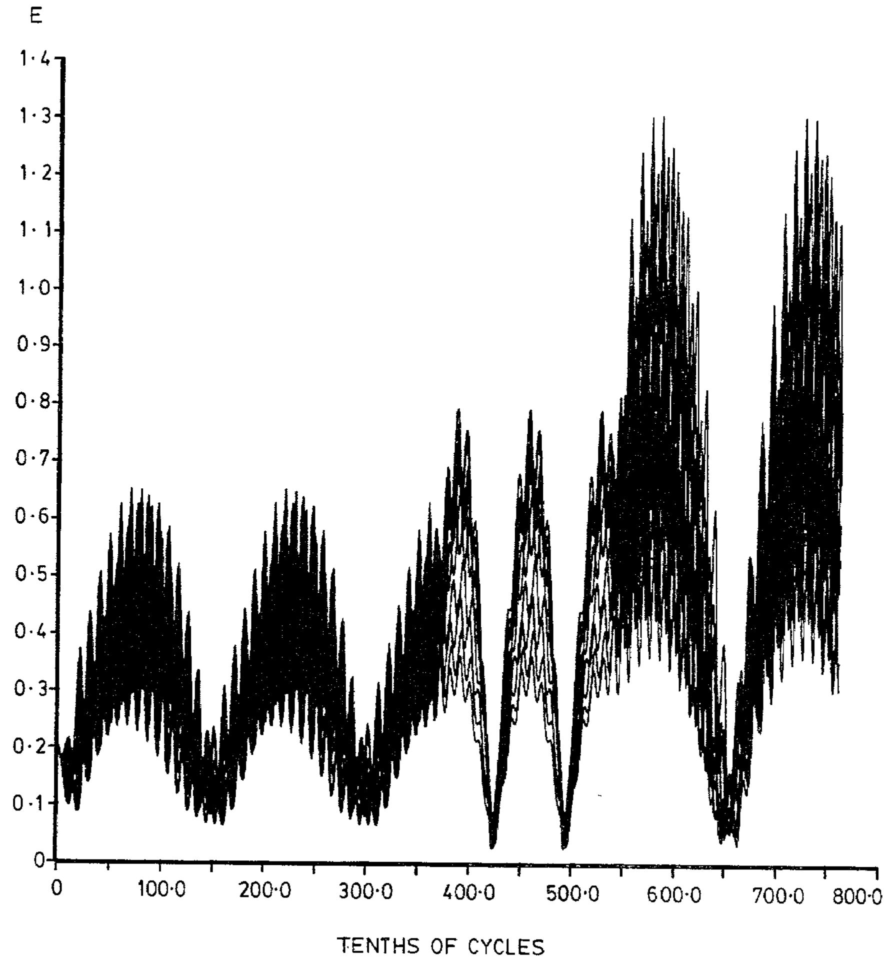

FIG. 19 Y envelope function

FIG. 19 illustrates the Y envelope function where there is a phase shift of −0.05 cycle (−18 degrees) between each section, i.e. between sections 4, 6 and between sections 6, 8. Again E exceeds 1 in the third section 8, indicating some transmission losses.

In the preceding examples, FIGS. 13 to 19, it was assumed that in the first and third section 4, 8, a=0.23342 and q=0.706, corresponding to a resolution of about 50, and in the centre section 6, a=0 and q=0.2.

Figure 20:
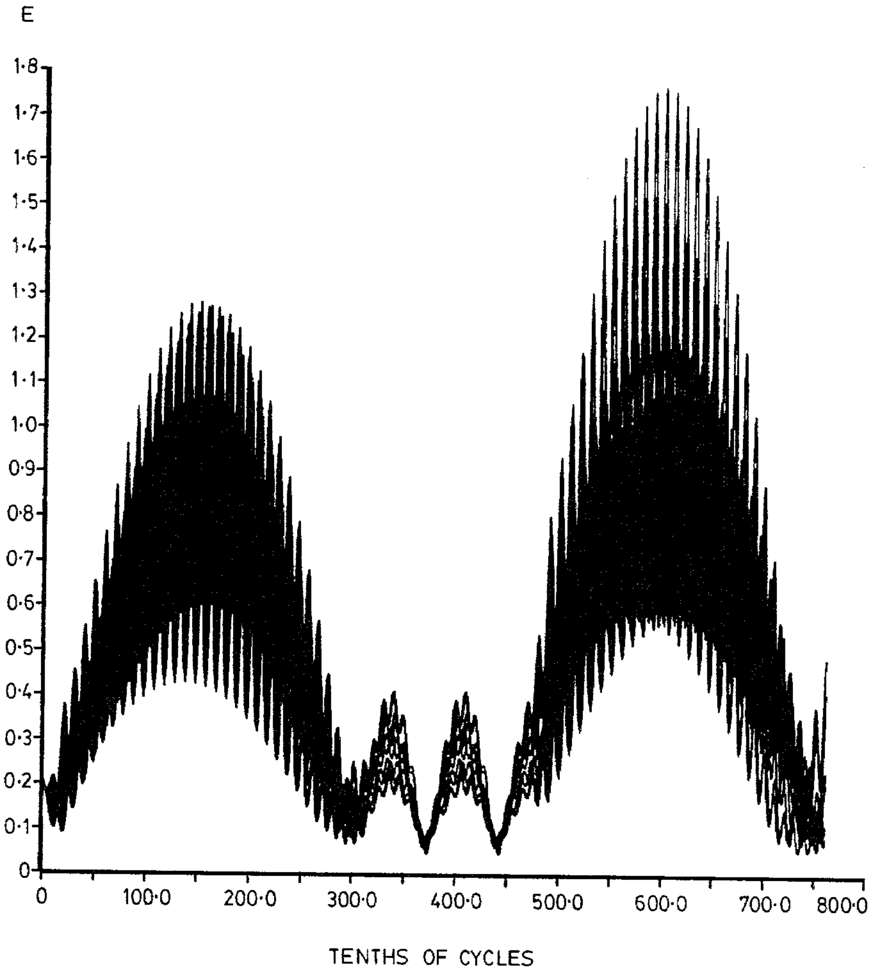

FIG. 20 Y envelope function

FIG. 20 illustrates the Y envelope function for an instrument operation at higher resolution (operating point a=0.236098 and q=0.706, corresponding to a resolution of about 220), where there is no phase shift between sections. It is assumed that the ions spend 28 cycles in section 4, 15 cycles in section 6 and 27 cycles in section 8. At this higher resolution E exceeds 1 in the first and third sections 4, 8 and some losses occur in the Y direction even with no phase shift. However a phase shift will produce even greater losses, as will be seen.

Figure 21:
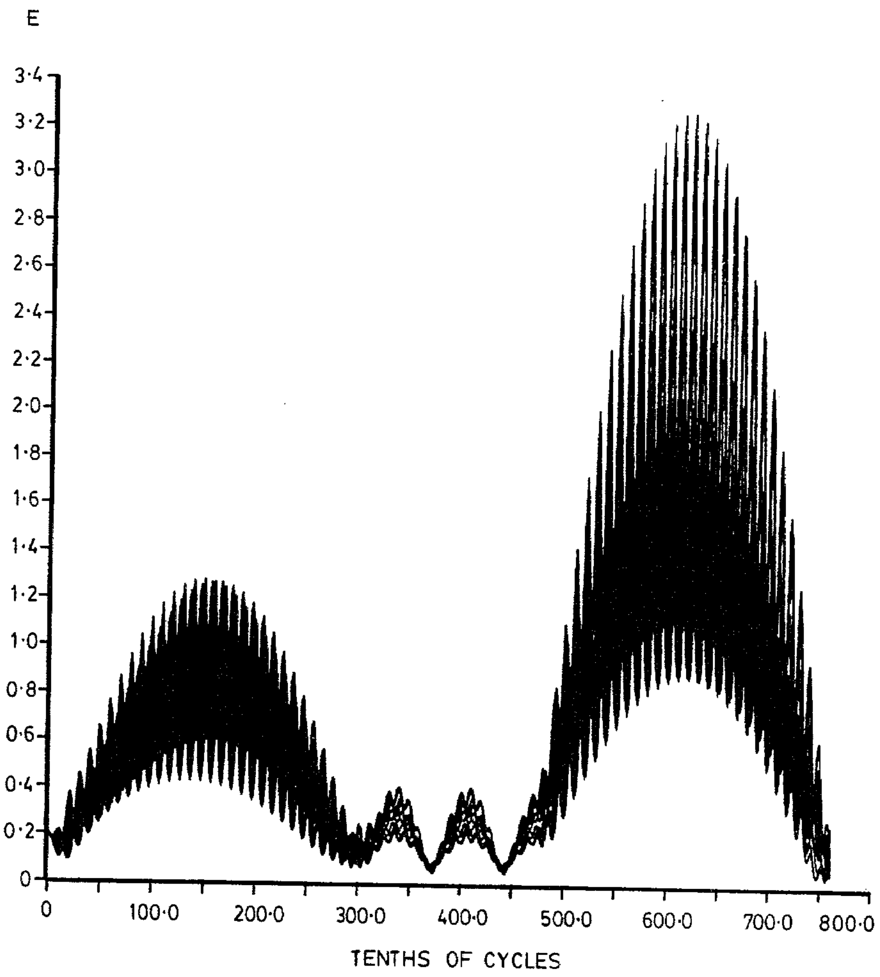

FIG. 21 Y envelope function

FIG. 21 shows the Y envelope function for the same situation as in FIG. 20 but with a phase change of 0.1 cycles (36 degrees) between sections 4 and 6 (no shift between sections 6 and 8). This reduces transmission considerably, as can be seen from the increased value of E. Detailed calculations show a reduction in transmission by a factor of about three as compared with the FIG. 20 case.

Figure 22:
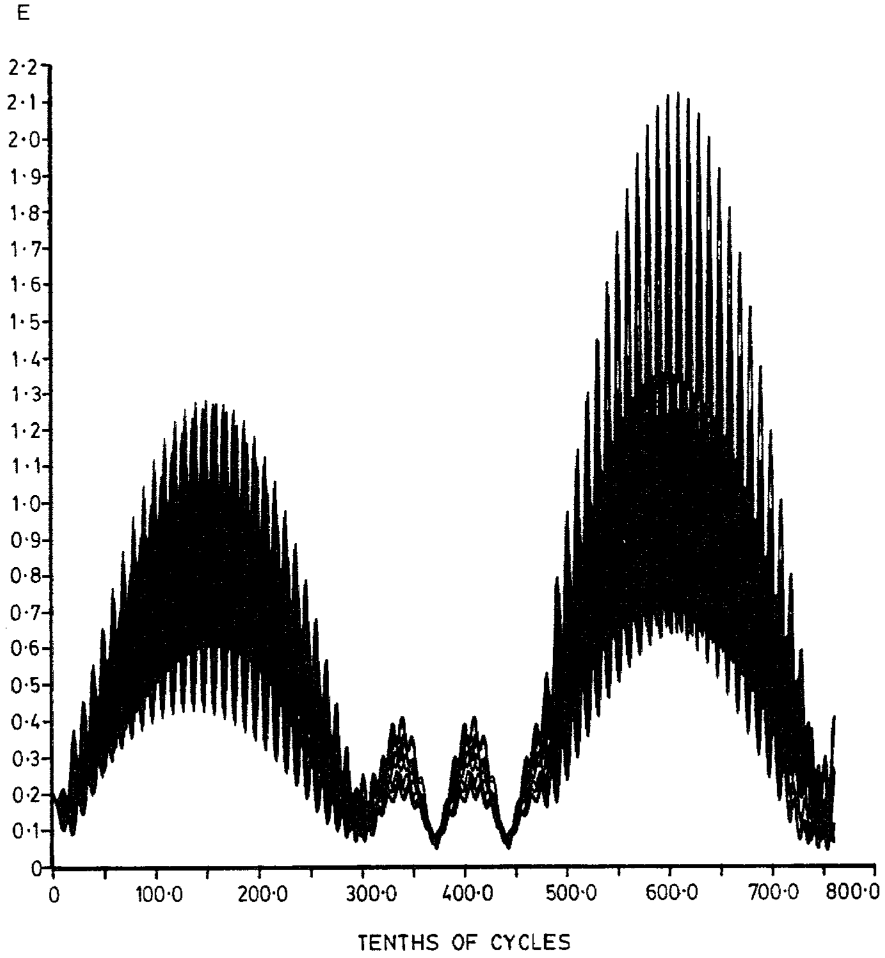

FIG. 22 Y envelope function

FIG. 22 shows the Y envelope function for the same situation as in FIG. 20 but with a phase change of only 0.03 cycles (11 degrees) between sections 6 and 8 (no shift between sections 4 and 6). Here E exceeds 1 in the first and third sections 4, 8, but not by as much as in FIG. 20 and detailed calculations show a reduction in transmission from the FIG. 20 situation by about 20 percent.

Figure 23:
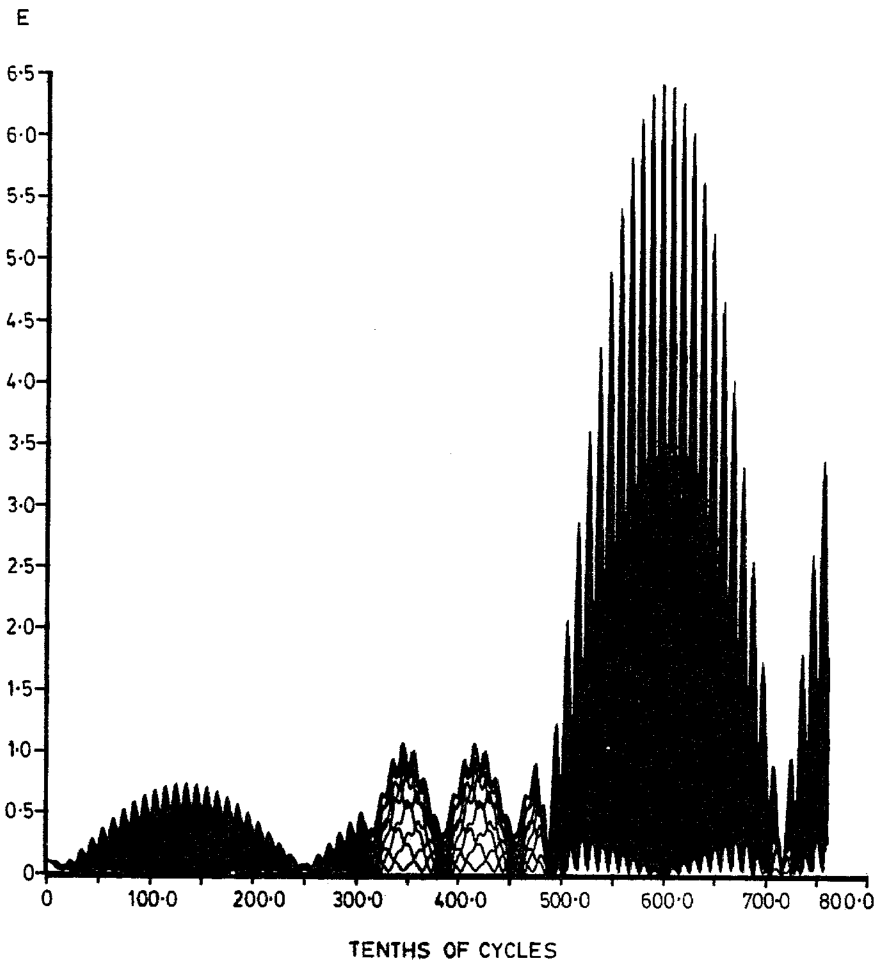

Transmission in the x direction is normally less than in the y direction, and the results depend on the particular source and on the ion energy, i.e. the number of cycles in the transition region between each quadrupole section. FIGS. 23 to 26 show four different x envelope functions, as follows:

FIG. 23 X envelope function

Here the operating point is assumed to be defined by a=0.23342 and q=0.706; resolution 50. The ions take 2 AC cycles to pass through each fringing field region. The ions spend 28 cycles in the first section 4, 15 cycles in the second section 6, and 27 cycles in the third section 8. The assumed source of ions has an envelope E=0.1, a maximum angular deviation A=0.0177, and an area=$0.00125\pi$. There is no phase shift between any of sections 4, 6, 8. It will be noted that although there is very low transmissivity at some initial phases, the transmissivity is relatively high at other initial phases, and detailed calculations show that the average transmission from the assumed source through to the ion detector 70 is about 23%.

Figure 24:
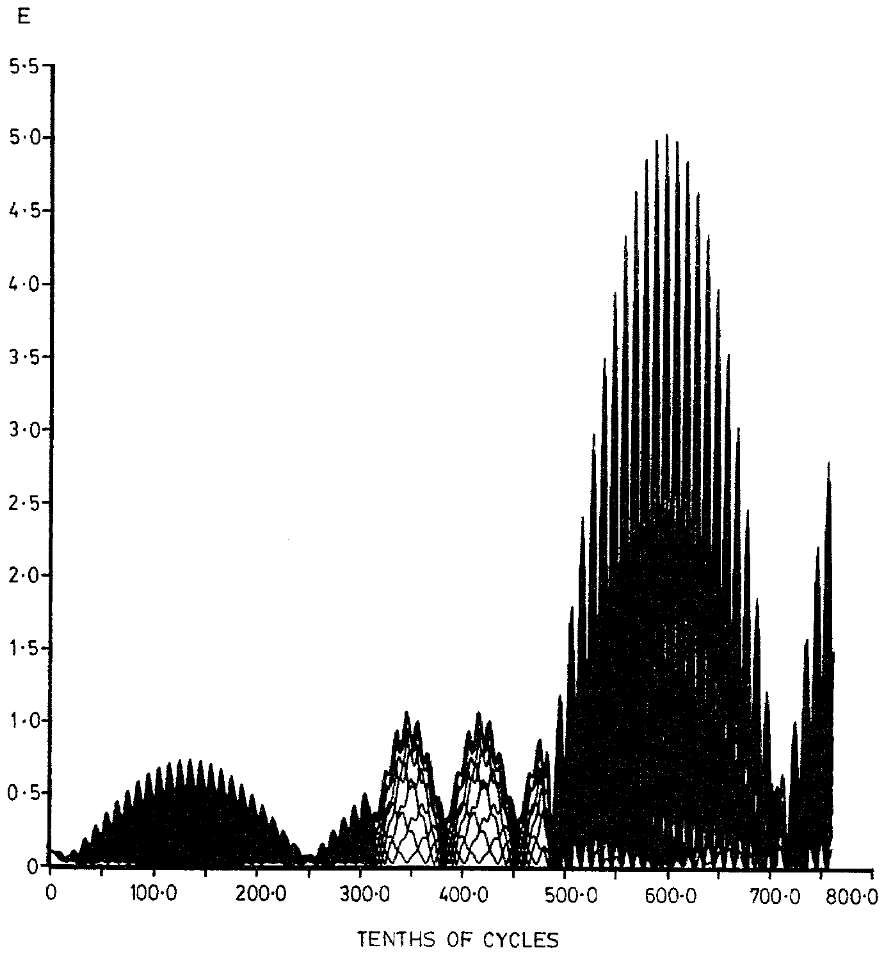

FIG. 24 X envelope function

The conditions here are the same as for FIG. 23, but there is a phase shift of −0.1 cycles (−36 degrees) between the second and third sections 6, 8 (and no phase shift between the first and second sections 4, 6). This results in a small improvement in transmission in the X direction.

Figure 25:
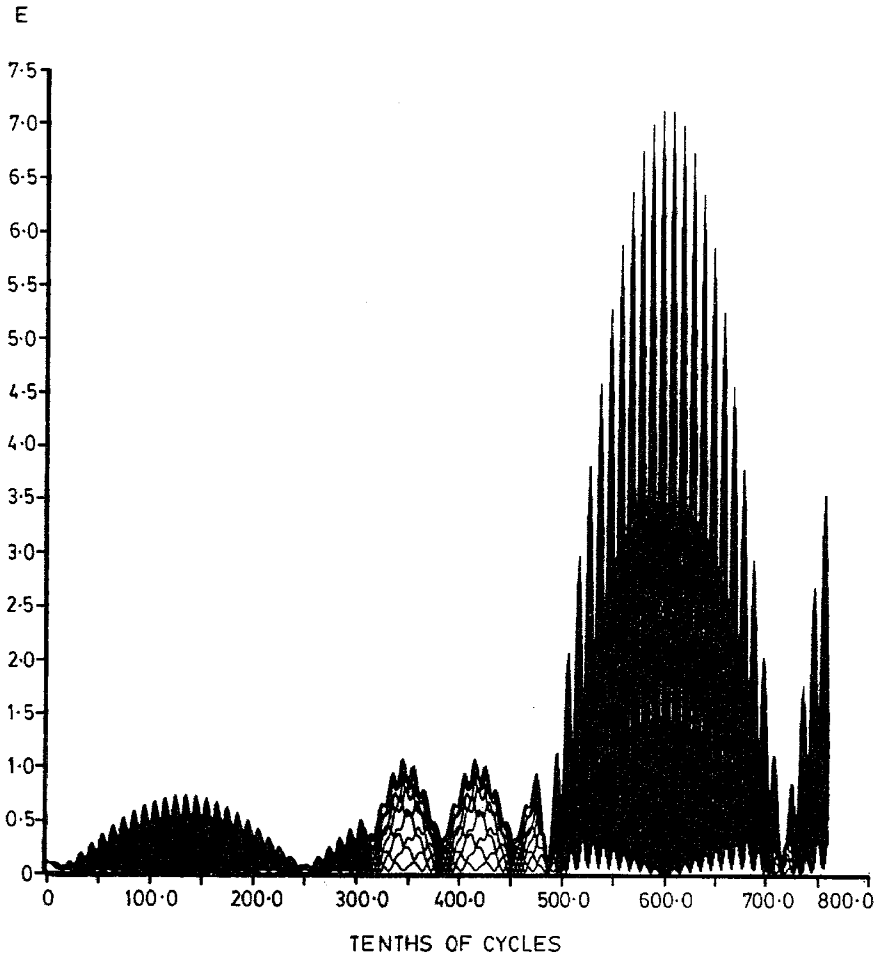

FIG. 25 X envelope function

The conditions here are the same as for FIG. 23, but there is a phase shift of +0.1 cycles between the second and third sections 6, 8 (and again no phase shift between sections 4,6.) This results in a small decrease in ion transmission in the X direction as compared with FIG. 23.

Figure 26:
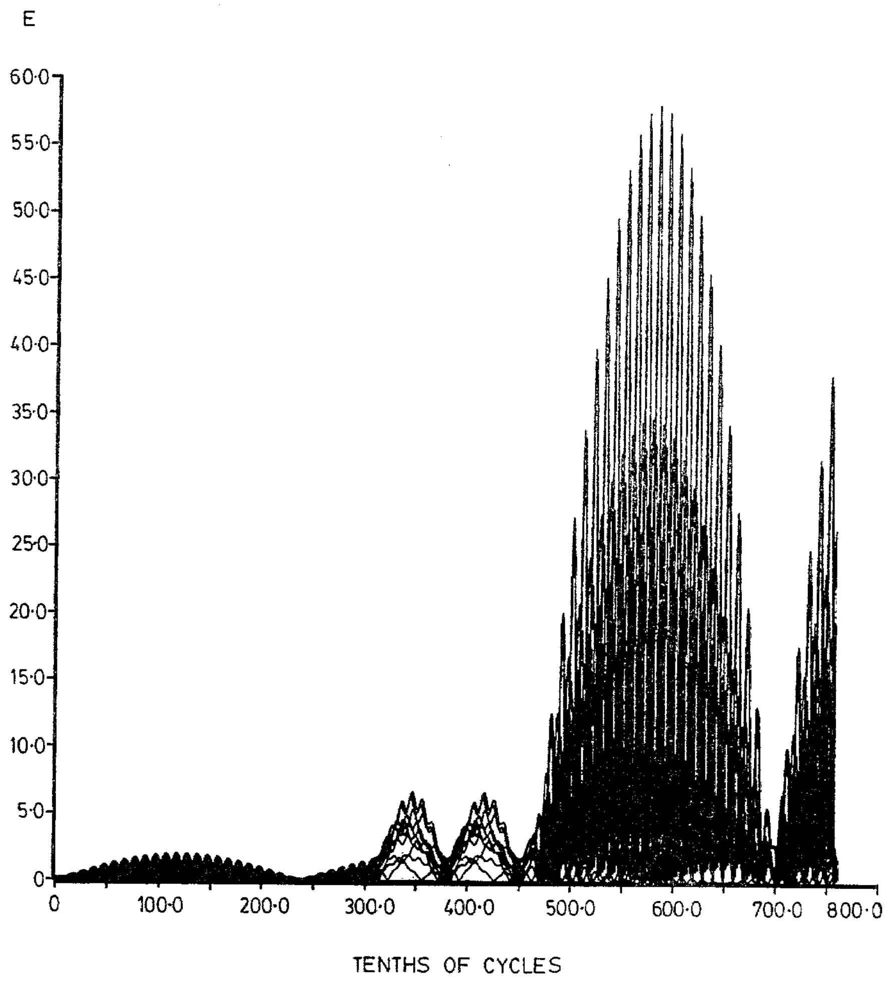

FIG. 26 X envelope function

This is an example at the same resolution as FIG. 23 but with a lower mass or higher energy ion which spends only 0.5 cycles in each transition region. (The ion also spends 30 cycles in the first section 4, 15 cycles in the centre section 6, and 29 cycles in the last section 8.) There is no phase shift between any of the sections. The ion transmission in this case is very low except for periods centered around two particular AC phases, and on average ion transmission amounts only to about 5%. However it is found that a phase shift of −0.1 cycles between the second and third sections reduces this relatively low transmission by a factor of 3.

X to Y Combination

Figure 27:
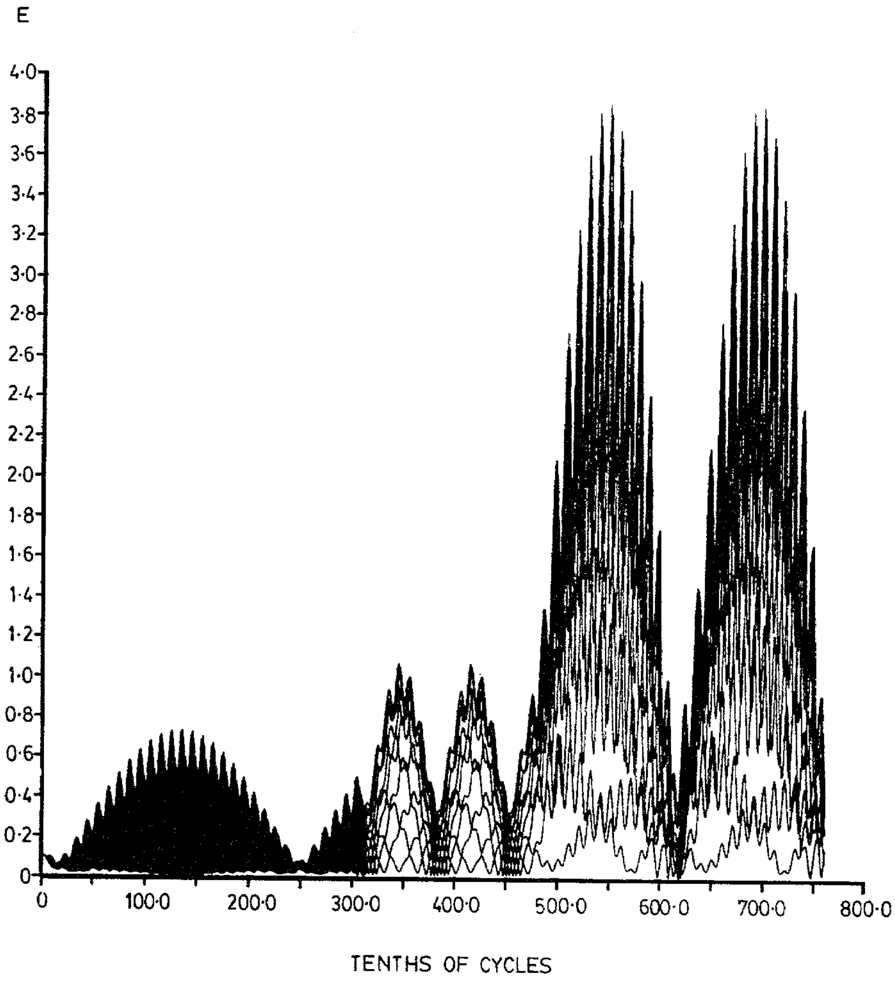

For some operating conditions it has been found by Peter Dawson that it is advantageous to operate the third section 8 with DC voltages switched with respect to the first section 4, but with synchronization of the AC voltages throughout. FIG. 27 shows an x to y envelope function in which the parameters are the same as for FIG. 23 but the DC for the third section 8 is switched to give an xy combination, and the AC is synchronized in phase for all three section. It will be noted that considerable improvement in ion transmission occurs as compared with FIG. 23.

Figure 28:
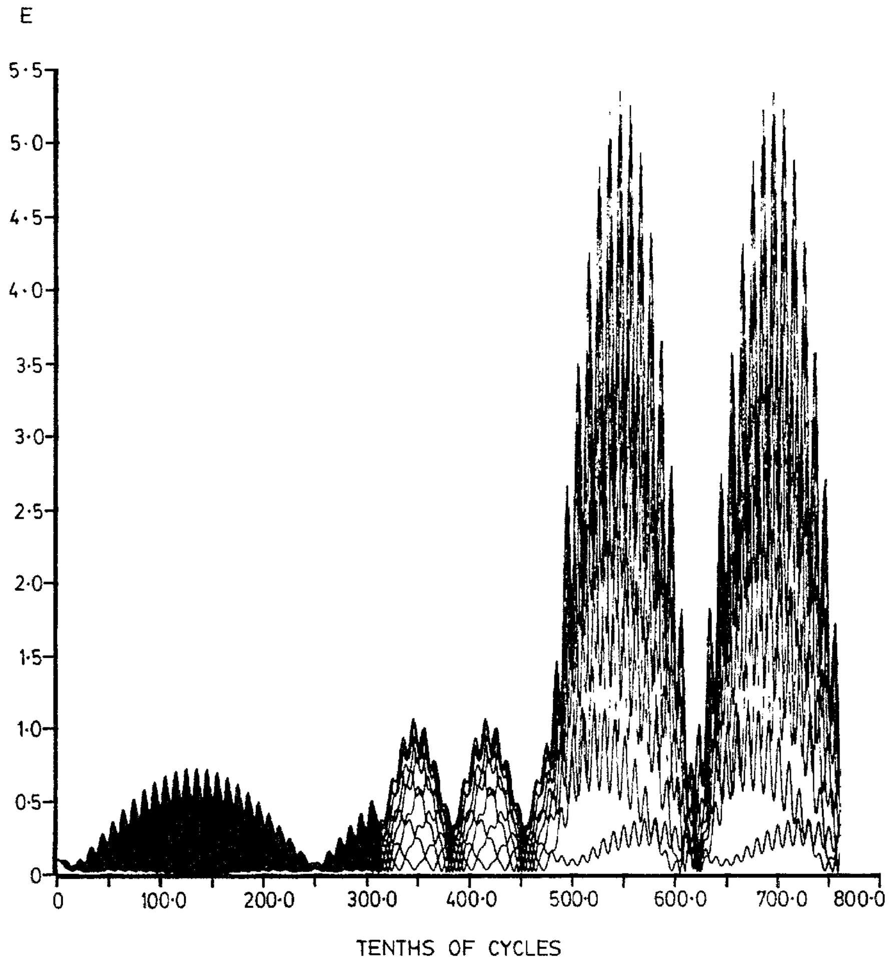

FIG. 28 shows an x to y envelope function under the same conditions as for FIG. 27, except that there is a phase shift of −0.1 cycles between the second and third sections 6, 8. Detailed calculations show the average ion acceptance to decrease by 35% as compared with FIG. 27.

Figure 29:
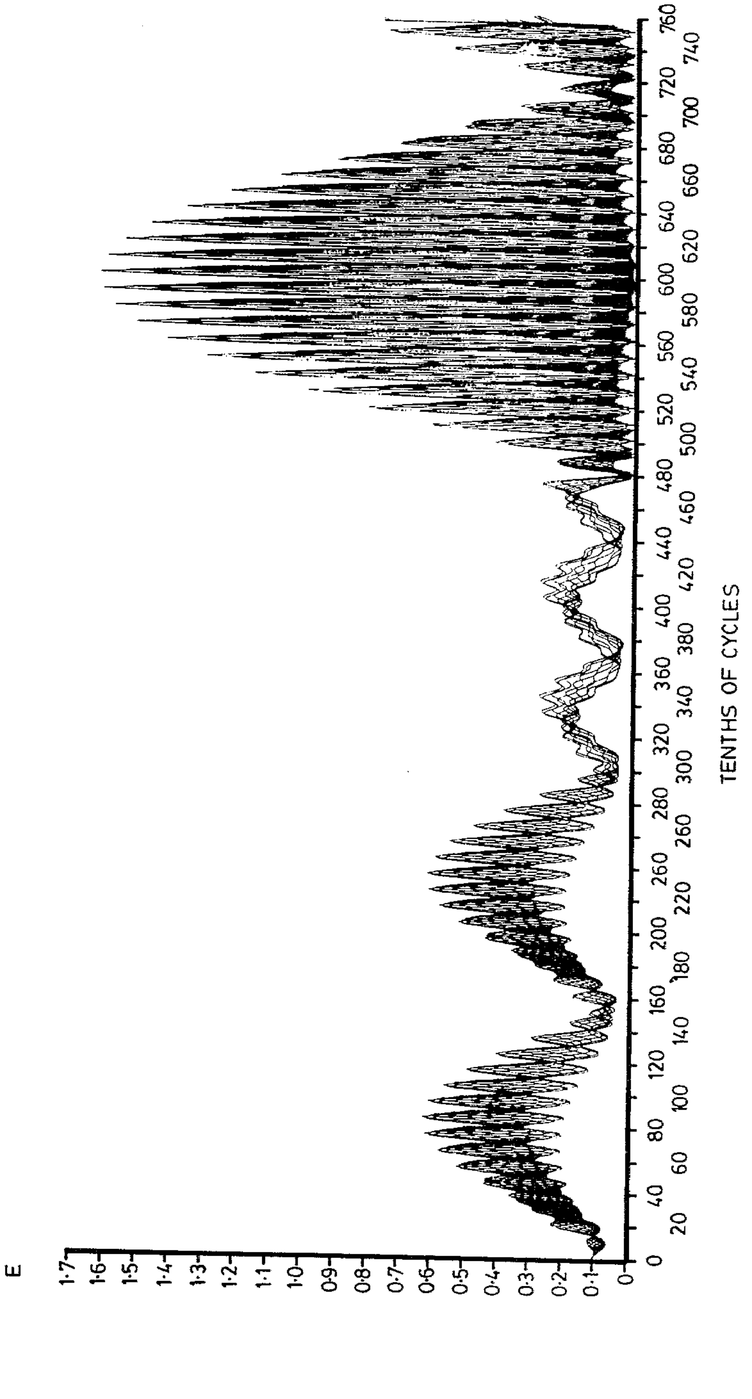

FIG. 29 shows a y to x envelope function under the same conditions as for FIG. 27 but with the DC for the third stage 8 switched in the oppositive transverse direction from that of FIG. 27 (still 90 degrees out of phase with FIG. 23). The AC is synchronized in phase for all three sections. This results in a considerable improvement in transmission.

In summary, it will be seen that it is important to have close spacing between the coupled quadrupoles in order to achieve high ion acceptance and transmission. The spacing should not normally exceed $r_o$, the radius of the inscribed circle between the rods. If $r_o$ varies for the three sections, the spacing will normally not exceed the smallest $r_o$. It will also be seen that the degree of phase shift in the y direction is important and becomes more important at high resolution. For best transmission in the y direction the phase shift should be below 0.1 cycles and preferably below 0.03 cycles, and typically will be zero or nearly zero.

The degree of importance of phase synchronization in the x direction depends on the operating conditions, and while a phase shift of 0.1 cycles is not always deleterious, full in-phase synchronization usually gives near optimum performance.

An electrical circuit for controlling phase relations between the quadrupole sections is shown in block diagram form in FIG. 30. As drawn, an oscillator 180 is provided which produces an AC voltage of the frequency required for mass spectrometer operation (typically 2 to 3 MHz). The AC voltage is applied through a buffer amplifier 182 (which prevents feedback) to a power amplifier 184 and to the AC terminals 186 of the first quadrupole section 4. DC is supplied by rectifiying a portion of the power amplifier output in a rectifier 188 and applying the resultant DC to the terminals 186. Mass selection is controlled by a mass command unit 190, which by varying the output of buffer amplifier 182 controls the level of the AC (and hence also the DC) voltage applied to terminals 186. This changes the operating point of the first quadrupole section 4, in order to select a desired mass for transmission through the rods 10.

The oscillator 180 is also connected through a phase shifter 192 to another buffer amplifier 194. The output of amplifier 192 is connected to another power amplifier 196 which applies AC to the terminals 198 of rods 14 of the centre quadrupole section 6. No DC is applied to the rods 14. This arrangement ensures that the AC voltage applied to rods 14 is synchronized in frequency and phase with that applied to rods 10 so that the resultant AC fields are synchronized in frequency and phase. As discussed, the phase shift is preferably zero or nearly zero.

The oscillator 180 is also connected through a second phase shifter 200 to another buffer amplifier 202. The output of buffer amplifier 202 is connected to power amplifier 204 which is connected to the AC terminals 206 of the rods 12 of the third quadrupole section 8. DC is again supplied by a rectifier 208, and the level of the voltages applied is controlled by a mass command unit 210 which adjusts the output of buffer amplifier 202. The use of phase shifter 200 again ensures that the AC voltage applied to the rods 12 is synchronized in frequency and phase with the AC voltage applied to the rods 10, 14, again so that the AC fields will be synchronized in frequency or phase. Preferably again the phase shift will be zero or nearly zero.

The DC voltages applied to the rods 10, 12 are normally in phase, but as discussed, the DC voltages applied to the rods can be reversed in some applications.

Although the invention has been described for use with three quadrupole sections in series, it may also be used with only two such sections in series, namely an AC-only section and an AC-DC section. Such an arrangement is shown and described in the said co-pending application of J. B. French, the description and drawings of which are hereby incorporated by reference into this application. In such system ions entering a vacuum chamber are guided into a conventional AC-DC quadrupole mass spectrometer by an AC-only section arranged in series with the conventional section, the rods of the AC-only section being of open construction to permit gas entering with the ions to flow through the rods and escape. The same phase and spacing relationships as described previously apply.

What we claim as our invention is:

1. A quadrupole mass spectrometer system having a vacuum chamber, first, second and third rod sets in said chamber, each rod set comprising four elongated parallel rods spaced laterally apart a short distance from each other to define an elongated space therebetween extending longitudinally through such rod set for ions to travel through said longitudinally extending space, said first rod set being located end to end with said second rod set and said third rod set being located end to end with said second rod set so that said second rod set is between said first and third rod sets and so that all said spaces are linearly aligned so that an ion may travel through all three of said spaces, the rods of said first set being electrically DC insulated from the rods of said second set, the rods of said third set being electrically DC insulated from the rods of said second set, means for introducing ions into said longitudinally extending space of said first set, means for applying both AC and DC voltages to the rods of said first set for said first set to act as a mass filter, means for applying essentially an AC-only voltage to the rods of said second set for said second set to act as an ion guide, means for introducing a target gas into the space between the rods of said second set and means for removing said gas from said chamber whereby said gas causes dissociation of said ions, means for applying both AC and DC voltages to the rods of said third set for said third set to act as a mass filter, the AC voltages applied to each of said sets of rods being synchronized in frequency, the AC voltage applied to one of said sets of rods being shifted in phase with respect to the AC voltages applied to the other sets of rods by an amount the absolute value of which is between zero and substantially 0.1 cycles, the ends of the rods of said first set being located very closely longitudinally adjacent the ends of the rods of said second set, and the ends of the rods of said second set being located very closely longitudinally adjacent the ends of the rods of said third set so that said AC voltages applied to said three sets of rods produce a continuous radio frequency field extending without substantial interruption along the length of said three rod sets, means for varying independently the amplitude of the AC voltage applied to said first rod set, and means for varying independently the amplitude of the AC voltage applied to said third rod set.

2. A system according to claim 1 wherein said absolute values are each between zero and 0.03 cycle.

3. A system according to claim 1 wherein said absolute values are each essentially zero.

4. A system according to claim 1 including means for admitting gas into the space between the rods of said second set, and means for removing gas from said chamber.

5. A system according to claim 1 wherein the space between the rods of said first set is of radius $r_{o1}$, the space between the rods of said second set is of radius $r_{o2}$, the space between the rods of said third set is of radius $r_{o3}$, the longitudinal spacing between the rods of said first and second sets and between the rods of said second and third sets being not greater than the smallest of radii $r_{o1}$, $r_{o2}$, $r_{o3}$.

6. A system according to claim 1 wherein said spaces between the rods of each set are each of the same radius $r_o$, the longitudinal spacing between the rods of said first and second sets and between the rods of said second and third sets being not greater than $r_o$.

* * * * *